(12) United States Patent
Neild et al.

(10) Patent No.: US 6,683,443 B2
(45) Date of Patent: Jan. 27, 2004

(54) SOFT START CIRCUIT FOR REGULATED POWER SUPPLY

(75) Inventors: Kristopher K. Neild, Aurora, IL (US); David A. Williams, Glen Ellyn, IL (US)

(73) Assignee: Texas Instruments Incorporated, Dallas, TX (US)

( * ) Notice: Subject to any disclaimer, the term of this patent is extended or adjusted under 35 U.S.C. 154(b) by 156 days.

(21) Appl. No.: 10/079,211

(22) Filed: Feb. 20, 2002

(65) Prior Publication Data

US 2003/0156438 A1 Aug. 21, 2003

(51) Int. Cl.[7] .................................................. G05F 1/40
(52) U.S. Cl. ........................ 323/282; 323/902; 323/901
(58) Field of Search ................................ 323/282, 901, 323/902; 363/21.01, 21.07, 21.15, 49, 55, 95, 97

(56) References Cited

U.S. PATENT DOCUMENTS

| | | | | |
|---|---|---|---|---|
| 4,692,687 A | * | 9/1987 | Yokoyama | 323/284 |
| 4,761,724 A | * | 8/1988 | Brown et al. | 363/21.07 |
| 5,124,630 A | * | 6/1992 | Tsutsumi | 323/299 |
| 5,515,263 A | * | 5/1996 | Otake et al. | 363/97 |
| 5,880,950 A | * | 3/1999 | Kim | 363/98 |
| 5,995,384 A | * | 11/1999 | Majid et al. | 363/21.18 |
| 6,385,061 B1 | * | 5/2002 | Turchi et al. | 363/21.15 |

* cited by examiner

*Primary Examiner*—Adolf D. Berhane
(74) *Attorney, Agent, or Firm*—W. Daniel Swayze, Jr.; W. James Brady; Frederick J. Telecky, Jr.

(57) ABSTRACT

A power supply feedback circuit includes a regulating element at an input side of an optical isolator. The control lead for the regulating element is connected to a voltage divider to receive the divided voltage. A bypass circuit is provided on the voltage divider to change the resistance in a bypassed branch of the voltage divider during start up of the circuit. The bypass time depends on charging of a capacitor at a control lead, base or gate, of an active element by the bypass circuit. The output voltage of the circuit is brought gradually to the desired level as the capacitor charges and the active element removes the bypass from the voltage divider or applies the bypass to the voltage divider.

16 Claims, 4 Drawing Sheets

SOFT START CIRCUIT FOR REGULATED POWER SUPPLY

BACKGROUND OF THE INVENTION

1. Field of the Invention

The present invention relates generally to a regulated power supply controller, and in particular to a feedback circuit for the controller of an isolated switching power supply.

2. Description of the Related Art

Power supplies are used in electronic devices to provide power to portions of the device's circuit at specific voltage levels. Regulated power supplies are required where the voltage levels must be tightly controlled for proper operation of the circuit. A regulated power supply has a primary side to which electrical power, such as from an AC line or a higher DC voltage, is connected. The primary side is connected to the primary windings of a power transformer, and the secondary windings of the transformer are connected to the secondary side of the circuit to provide the regulated output voltage of the power supply. The output voltage may be, for example, a smaller DC voltage. The transformer provides an isolation barrier between the primary side and the secondary side.

Feedback is required to ensure the tight regulation necessary for controlling the output voltage level, and the feedback signal must be provided across the isolation barrier. An optical isolator is utilized to communicate the feedback signal across the isolation barrier.

A common type of regulated power supply is a switching power supply, in which regulation is performed by a square wave signal having a duty cycle that changes depending on the voltage to be output. The transmission of power from the primary side to the secondary side is switched on and off using the square wave, and the averaged value of the changing duty cycle rests in the regulated output voltage.

FIG. 1 shows a power supply circuit including a feedback circuit utilized to communicate the feedback signal across the isolation barrier between the primary side and the secondary side of the regulated power supply circuit. The feedback circuit includes a voltage divider made up of a resistor 10 and a resistor 12 which is provided across the output voltage $V_{out}$. The divided voltage is provided at a tap that is connected to a control lead of a reference element 14. In one embodiment, the reference element is a TL431 precision adjustable three terminal shunt voltage regulator, made by Texas Instruments. The reference element 14 is connected to a LED part 16 of an optical isolator 18, also referred to as an optical coupler, so that variations in the signal applied to the control lead result in changes in the light output by the LED part 16. The LED part 16 typically emits light in the infrared region, although visible light or other wavelengths are of course also possible, Also linked to the control lead of the reference element 14 is an RC combination of a resistor 20 and a capacitor 22 linked to the output voltage $V_{out}$, and an RC combination of a resistor 24 and a capacitor 26 linked to the LED part 16. A resistor 28 is provided in series with the LED part 16 between the LED part 16 and the output voltage $V_{out}$.

The optical isolator 18 provides signal transmission across the isolation barrier 30, and the light, such as infrared light, from the LED part 16 is transmitted to a photodiode 40 of the optical coupler 18. The photodiode 40 is connected to a base of a transistor 32 within the optical isolator 18. The level of received light by the photodiode 40 is translated to current flow through the transistor 32 and fed to an output resistor 34. An output 36 to a control circuit 38 for the power supply is taken at the connection between the transistor 32 and the resistor 34.

The power supply that utilizes the feedback circuit is shown in simplified form, including the controller, or control circuit 38, which is a pulse width modulation controller. The output of the controller 38 is connected to the gate lead of a power FET 42. The FET 42 is connected to the primary of a transformer 43 which receives the input voltage for the power supply. The secondary side of the transformer 43 receives the transformed voltage switched by the pulse width modulator 38, forwards it through diodes 44 and 45, through an inductor 46 and through a capacitor 47 to produce the output voltage of the power supply at the outputs 48 and 49.

The feedback circuit, thus, operates through the control circuit 38 to cause regulation of the power supply to generate a desired output voltage. The output voltage is provided as the voltage $V_{out}$ that is provided to the LED 16 of the optical isolator 18.

At startup of the circuit, the reference element 14 does not respond until the operating voltage has reached the desired operating point. The startup response of the reference element 14 causes an overshoot in the feedback voltage so that the output voltage overshoots the desired output voltage level. The circuit then overcorrects the output voltage, which results in ringing in the circuit during startup.

SUMMARY OF THE INVENTION

The present invention provides a power supply feedback circuit with a gradual startup to avoid ringing in the circuit. The present circuit includes a control connected to the reference element to reduce the output voltage to a lower level during startup. The control then gradually raises the output voltage to the desired operating level. In one example, the control circuit includes an active element and an RC combination connected to the control lead of the reference element.

DETAILED DESCRIPTION OF THE PREFERRED EMBODIMENTS

Figure 1:
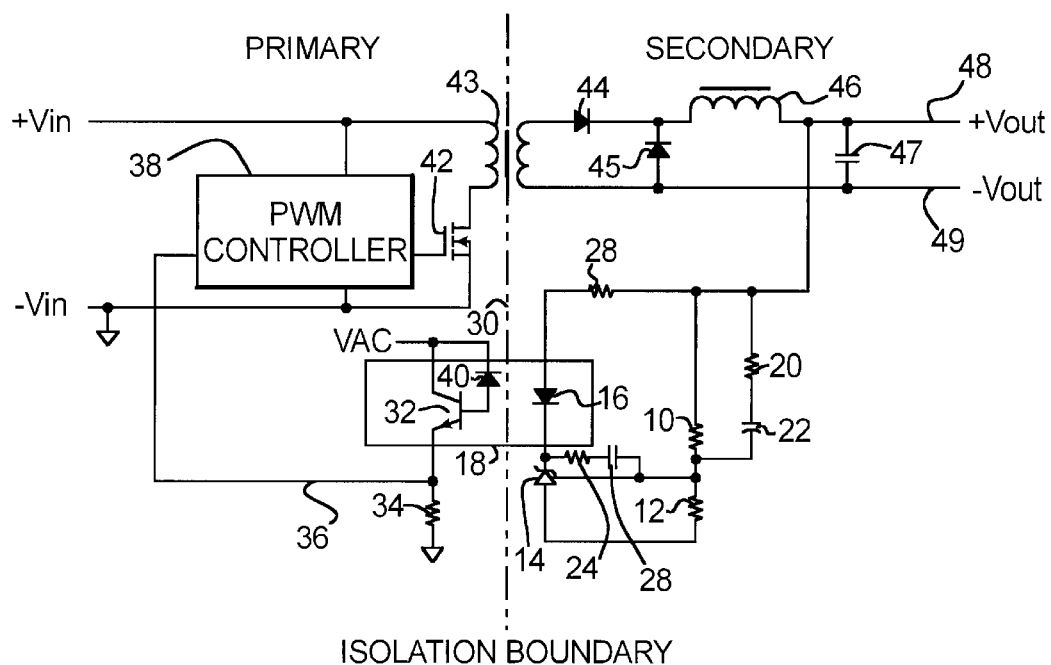
FIG. 1 is a circuit diagram of a standard optocoupler feedback in an isolated switched mode power supply circuit.
Figure 2:
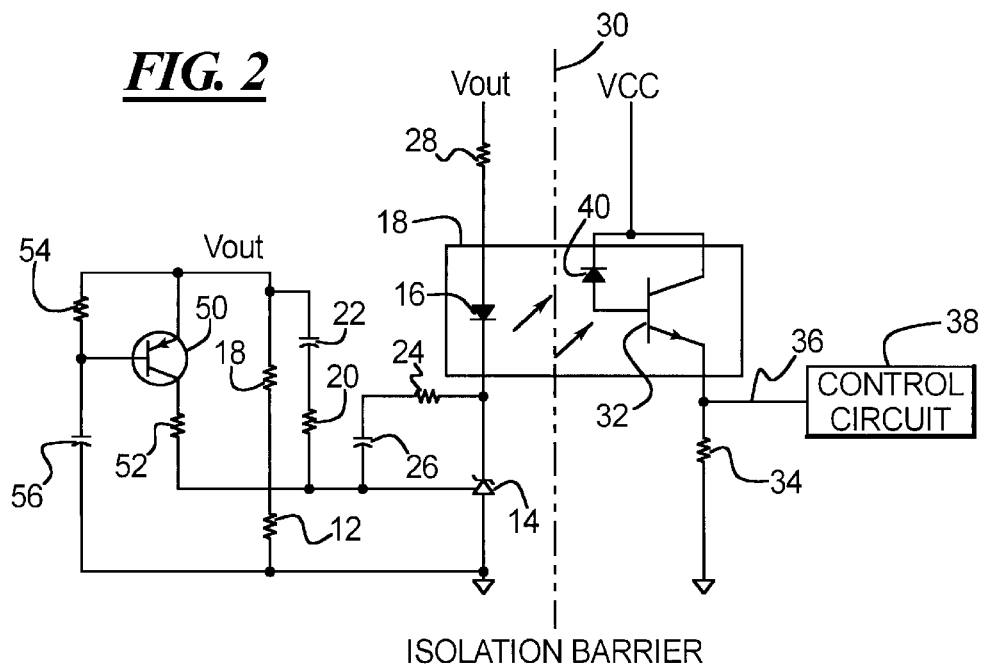
FIG. 2 is a circuit diagram of an optocoupler feedback circuit according to the principles of the present invention.

Referring to FIG. 2, a feedback portion of a power supply circuit is shown. The power supply circuit may be the switched mode power supply of FIG. 1 or some other of power supply circuit. The feedback circuit of FIG. 2 is shown flipped right for left compared to the illustration of FIG. 1. The illustrated circuit includes many elements in common with the circuit of FIG. 1, and so the same reference characters are used therefore.

The circuit illustrated in FIG. 2 includes the additional elements of an active element, which here is a bipolar transistor 50 connected between the output voltage $V_{out}$ and the divided voltage at the tap between the resistors 10 and 12. An additional resistor 52 is provided between the resistor 50 and the voltage divider. The transistor 50 and resistor 52 are thus placed across the upper voltage divider resistor 10 to form a bypass. Operation of the transistor 50 is controlled by a resistor 54 and a capacitor 56 connected at the base of the transistor 50. The conductivity of the transistor 50 is controlled by the voltage across the capacitor 56.

In operation before startup of the power supply, the capacitor 56 has no charge on it, and so the voltage across the capacitor 56 is zero and the transistor 50 is off. Upon startup, the output voltage $V_{out}$ is applied to the resistor 54 and capacitor 56 combination and the voltage is initially passed by the capacitor 56 so that substantially all of the voltage appears across the resistor 54. Over time, the capacitor 56 charges through the resistor 54 until the voltage across the capacitor 56 reaches a level equal to the output voltage $V_{out}$.

The changing voltage across the capacitor 56 is applied at the base of the transistor 50 to cause the transistor 50 at startup to initially be turned on and then to be turned off as the capacitor charges. The transistor 50 turn on brings the bypass circuit into full connection at the tap of the voltage divider, which places the resistor 52 in parallel with the upper divider resistor 10. The changing values of the voltage divider are sensed by the control lead of the regulating element 14, which causes the power supply to initially regulate the output voltage $V_{out}$ to a lower level and a the capacitor 56 charges to bring the output voltage up to the desired final value.

Thus, the present circuit gradually increases the output voltage $V_{out}$ during startup. The startup time is set to avoid the over correction which would otherwise occur. The time from startup to full operating voltage is determined by the values of the resistor 54 and the capacitor 56.

Figure 3:
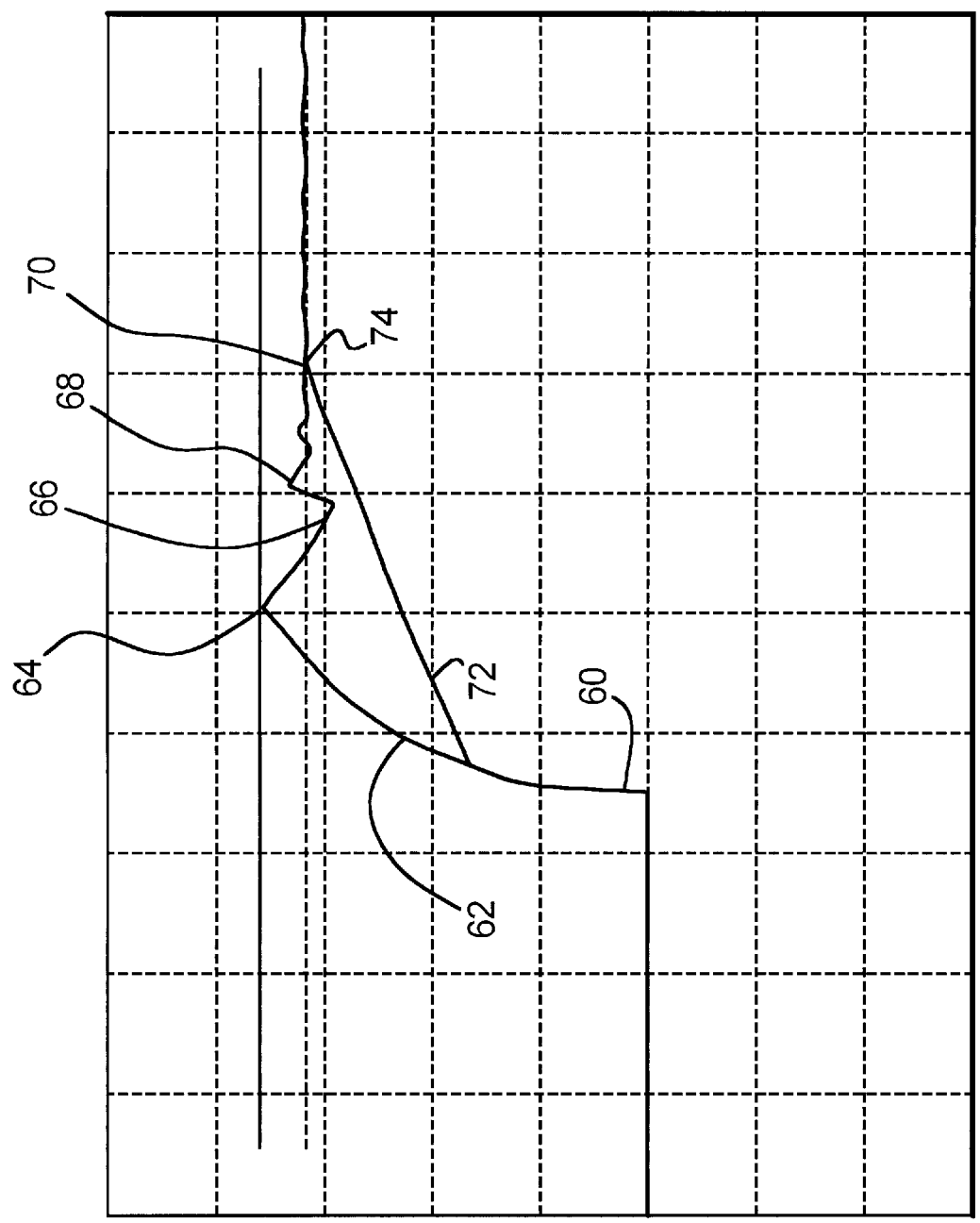
FIG. 3 is a graph of output voltage of a power supply comparing the start up voltages for the circuit of FIG. 1 and of FIG. 2.

In FIG. 3 is shown a graph of the output voltage $V_{out}$ for the circuit shown in FIG. 1 compared to the circuit of FIG. 2. In the illustrated example, the input voltage is a 48 Volt DC signal, and the output is a 16 Volt DC regulated output. The turn on of the circuit is illustrated as the vertical portion 60 of the waveform. In the circuit of FIG. 1, as shown in the waveform 62, the output voltage $V_{out}$ quickly rises to the target value of 16 Volts and overshoots the target, reaching 17.7 volts at its peak at 64. The circuit then attempts to correct for the overshoot 64 by bringing the output voltage $V_{out}$ down. This results in an undershoot 66 of the target voltage by a considerable amount. A further correction 68 of the signal is imposed, which continues with decreasing amplitudes until the ringing dies out at 70.

By contrast, the circuit according to the present invention provides a slow startup, also termed a soft start, which brings the waveform 72 up from the turn on point 60 through a gradual increase to reach the target voltage of 16 volts at a time 74 only slightly later than the stabilization of the first waveform at 70 on the target voltage of 16 volts. From the time 74 on, the soft start circuit power supply provides the same output voltage $V_{out}$ as the first circuit.

Considered another way, present invention provides a bypass circuit with the transistor 50 in a bypass of the upper resistor 10 of the voltage divider. The effect is to make the circuit act as if it is already in control of the output voltage $V_{out}$ before the desired output voltage is reached.

Figure 4:
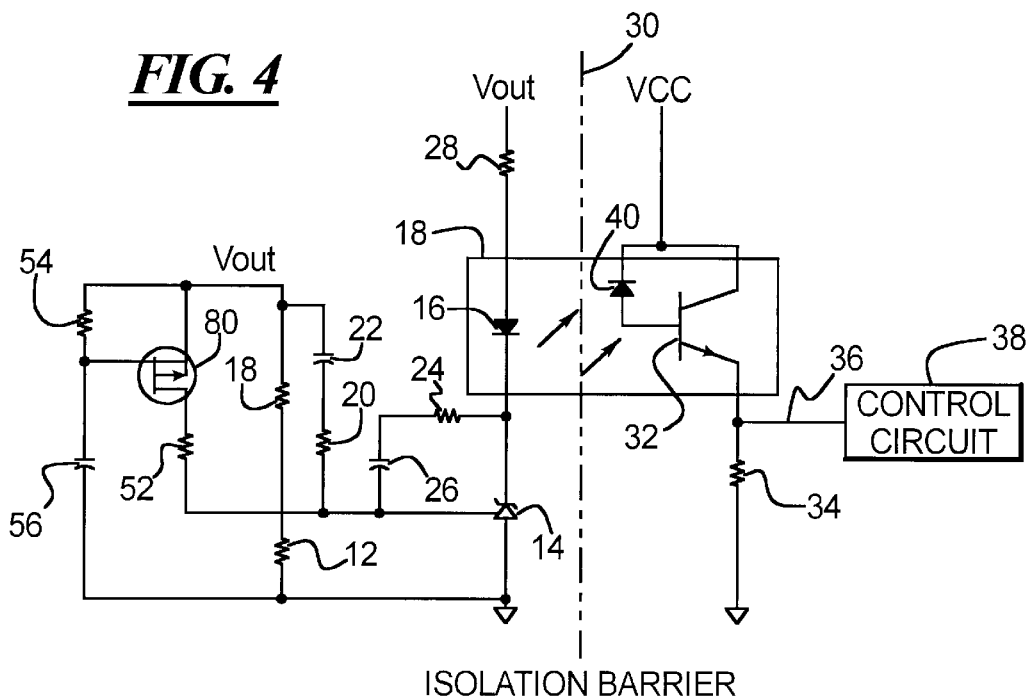
FIG. 4 is a circuit diagram of a further embodiment of the present feedback circuit.

In FIG. 4, the bypass circuit includes a field effect transistor (FET) 80. The FET 80 is connected into the bypass circuit in place of the bipolar transistor 50. The resistor 52 is connected between the FET 80 and the voltage divider 10 and 12. The gate lead of the FET 80 is connected between the resistor 54 and the capacitor 56. The bypass circuit operates to soft start the reference element 4 as described above by bringing the output voltage slowly up to the desired level and thereby avoid the overshoot.

Figure 5:
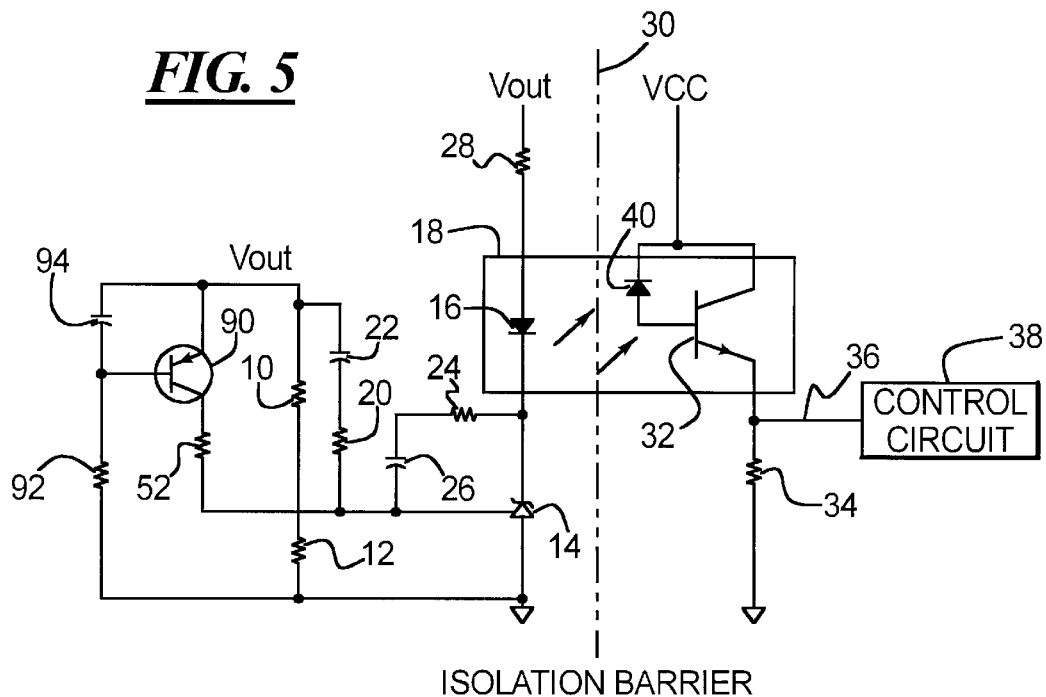
FIG. 5 is a circuit diagram of another embodiment of the isolated feedback circuit.

FIG. 5 provides a bypass circuit using a bipolar transistor 90, although the transistor 90 is an n-p-n transistor as compared to the p-n-p transistor 50 of FIG. 3. The transistor type is not the only change, however. The base of the transistor 90 is connected to ground through a resistor 92 and to the output voltage $V_{out}$ through a capacitor 94. On other words, the position of the resistor 92 and the capacitor 94 is reversed from the embodiments of FIGS. 3 and 4.

The gradual charging of the capacitors 56 in FIG. 4 and 94 in FIG. 5 brings the operating voltage up slowly to the desired level. Overshooting of the desired output voltage is avoided.

Figure 6:
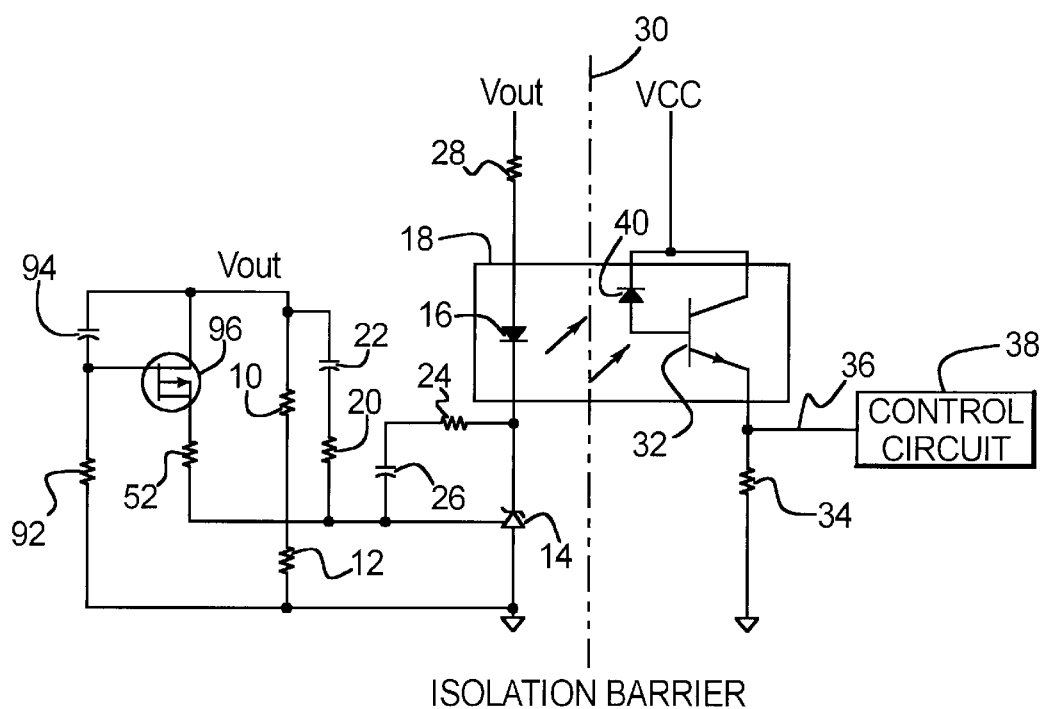
FIG. 6 is a circuit diagram of yet a further embodiment of the isolated feedback circuit.

FIG. 6 provides a further embodiment in which the position of the capacitor 94 and resistor 92 is as provided in FIG. 5, but the active element is a field effect transistor (FET) 96. Other elements remain the same and are provided with the same reference characters.

The foregoing embodiments provide for gradually changing the current flow through the bypass circuit of the transistor as the capacitor charges to change the output voltage from the initial value to the ongoing operational value. The bypass circuit may be connected to either increase the current flow through the bypass circuit from start up to ongoing operation or to decrease the current flow through the bypass circuit from start up to ongoing operation, depending on the circuit design. The bypass circuit which increases the current flow would continue to carry current during circuit operation as the power supply is at the operational level, whereas the bypass circuit which decreases current flow would effectively disconnect from the circuit once the ongoing operational level is reached. The bypass circuit may be connected to bypass either the upper or lower resistor of the voltage divider, also depending on circuit design. Each of these variations is within the scope of the present invention.

The invention therefore provides a power supply feedback circuit includes a regulating element at an input side of an optical isolator. The control lead for the regulating element is connected to a voltage divider to receive the divided voltage. A bypass circuit is provided on the voltage divider to change the resistance in a bypassed branch of the voltage divider from start up of the circuit to ongoing operation. The bypass time depends on charging of a capacitor at a control lead, either a base or gate, of an active element in the bypass circuit. The output voltage of the circuit is brought gradually to the desired level as the capacitor charges and the active element removes the bypass from the voltage divider or adds it to the voltage divider.

The optical isolators or opto-coupler, shown in the illustrated embodiments include a photodiode detector 40 that drives the base of the transistor 32. This type of device provides fast response times and high output current capability. However, the present invention is applicable to circuits using other types of optical couplers, or optical isolators, as well, including for example an optical coupler having a phototransistor as the photodetector element. The LED in the device emits light, typically in the infrared region, across the isolation barrier to the base of the phototransistor, which then controls the output. This type of device has the advantage of high output current capacity.

A further type of optical coupler which can be used in the present invention includes a photodiode as the photodetector element. The output of the device is directly taken from the photodiode part. The advantage of using such an optical coupler is the wide bandwidth available, although it can drive very little current.

Thus, the present invention is not limited by the type of optical coupler used in the isolated feedback circuit.

It is also contemplated to use the present invention in a circuit which eliminates the use of an optical coupler and instead provides a power supply feedback that does not isolate the inputs and outputs from one another.

The regulator element 14 shown in the preferred embodiment is a commercially component part. However, the functionality of the regulator can be provided by a circuit made from, for example, from an operational amplifier and a reference voltage. The present invention is thus applicable to use with regulators which are multiple element circuits as well as with the single regulator component.

The scope of the present invention extends to any circuit in which a voltage divider is used and it is desired to change the impedance value in a branch of the voltage divider when power is first applied to the circuit.

Thus, there is shown and described a gradual startup bypass circuit for avoiding overshoot in an output voltage of a regulated power supply. The power supply to which the present invention is applied is in one example a switching power supply. However, other types of power supplies may be controlled using the present invention as well.

The soft start circuit of the present invention also is applicable to other circuits and is not limited to use only on power supply circuits. Feedback circuits of many types may benefit from the present gradual start operation.

Although other modifications and changes may be suggested by those skilled in the art, it is the intention of the inventors to embody within the patent warranted hereon all changes and modifications as reasonably and properly within the scope of their contribution to the art.

We claim:

1. A power supply feedback circuit, comprising:
   an optical isolator having an input side with a light emitting element and an output side with a photosensor;
   a regulator connected to said light emitting element at said input side of said optical isolator, said regulator having a control lead;
   a voltage divider having a tap for a divided voltage connection, said tap being connected to said control lead; and
   a bypass circuit connected to said tap of said voltage divider, said bypass circuit operating to apply a first voltage level to said control lead during start up of said power supply feedback circuit which differs from a ongoing operating voltage to be applied during ongoing operation of said power supply, said bypass circuit operating to change a voltage applied to said control lead from said first voltage to said ongoing operating voltage over a predetermined time.

2. A power supply feedback circuit as claimed in claim 1, wherein said bypass circuit includes an active element and a capacitor, said capacitor being connected to a control lead of said active element.

3. A power supply feedback circuit as claimed in claim 2, wherein said active element is a bipolar transistor.

4. A power supply feedback circuit as claimed in claim 2, wherein said active element is a field effect transistor.

5. A power supply feedback circuit as claimed in claim 2, wherein said active element is a transistor connected to an output voltage of said power supply and to said control lead of said regulator, said transistor having a control input connected between said capacitor and a resistor, said resistor and said capacitor being connected between said output voltage and ground.

6. A power supply feedback circuit as obtained in claim 1, wherein said regulator is a regulating element.

7. A power supply feedback circuit as claimed in claim 1, wherein said bypass circuit includes an active element and a resistor connected in series to said tap of said voltage divider, said active element operating to vary current flow through said resistor.

8. An isolated feedback circuit, comprising:
   an optical coupler having an output connected to a control and having an input;
   a shunt regulator element connected to said input, said shunt regulator element having a control lead;
   a voltage divider having a tap connected to said control lead of said shunt regulator element, said voltage divider having first and second resistors;
   a transistor connected as a bypass of said first resistor of said voltage divider, said transistor a having a control input; and
   a resistor and capacitor circuit connected to said control input of said transistor, said capacitor charging upon startup of said feedback circuit to cause a gradual change in voltage at said control lead of said shunt regulator element from an initial value to an ongoing operational value.

9. An isolated feedback circuit as claimed in claim 8, wherein said transistor gradually reduces current flow through said bypass as said voltage changes from said initial value to said ongoing operational value.

10. An isolated feedback circuit as claimed in claim 8, wherein said transistor gradually increases current flow through said bypass as said voltage changes from said initial value to said ongoing operational value.

11. A soft start circuit, comprising:
    a voltage divider having first and second branches and a tap therebetween;
    a control lead connected to said tap for controlling a device to be started;
    a bypass connected to across said first branch of said voltage divider, said bypass being controlled to apply a first voltage level to said tap during start up which differs from a ongoing operating voltage, said bypass circuit operating to change a voltage applied to said tap from said first voltage to said ongoing operating voltage over a predetermined time.

12. A soft start circuit as claimed in claim 11, wherein said first branch is connected between a power supply and said tap.

13. A soft start circuit as claimed in claim 11, wherein said first branch is connected between said tap and ground.

14. A soft start circuit as claimed in claim 11, wherein said bypass circuit includes:
    a transistor connected in series with a first resistor across said first branch,
    a capacitor and a second resistor connected in series between a power supply and ground, and
    a control lead of said transistor connected between said capacitor and said second resistor.

15. A soft start circuit as claimed in claim 11, wherein said device to be started is a power supply.

16. A soft start circuit as claimed in claim 11, further comprising:
- a regulator having a control input connected to said control lead;
- an LED of an optical coupler connected to said regulator;
- a power supply having a power input and a power output and a control input;
- an output of said optical coupler connected to said control input of said power supply; and
- said LED of said optical coupler and said voltage divider being connected to said power output of said power supply so that said optical coupler and said voltage divider and said bypass circuit form a feedback for said power supply.

* * * * *